(12) United States Patent
Wajda et al.

(10) Patent No.: US 7,539,505 B2
(45) Date of Patent: May 26, 2009

(54) METHOD OF PERFORMING A DYNAMIC PUSH-TO-TALK SERVICE

(75) Inventors: Wieslawa Wajda, Keltern (DE); Manfred Weiss, Neuhausen (DE)

(73) Assignee: Alcatel, Paris (FR)

( * ) Notice: Subject to any disclaimer, the term of this patent is extended or adjusted under 35 U.S.C. 154(b) by 531 days.

(21) Appl. No.: 11/369,725

(22) Filed: Mar. 8, 2006

(65) Prior Publication Data

US 2006/0205428 A1 Sep. 14, 2006

(30) Foreign Application Priority Data

Mar. 9, 2005 (EP) .................................. 05290535

(51) Int. Cl.
*H04B 7/00* (2006.01)
(52) U.S. Cl. ....................... 455/518; 455/519
(58) Field of Classification Search .......... 455/517–521
See application file for complete search history.

(56) References Cited

U.S. PATENT DOCUMENTS 6,253,091 B1 6/2001 Naddell et al.

2005/0233776 A1* 10/2005 Allen et al. ................. 455/567

FOREIGN PATENT DOCUMENTS

| WO | WO 00/22860 A1 | 4/2000 |
| WO | WO 2004/114643 A1 | 12/2004 |
| WO | WO 2005/004349 A2 | 1/2005 |

* cited by examiner

*Primary Examiner*—Raymond S Dean
(74) *Attorney, Agent, or Firm*—Fay Sharpe LLP

(57) ABSTRACT

The invention concerns a method of providing a Push-to-Talk (=PTT) based communication service to subscribers of the PTT service by means of a PTT server which dynamically creates a PTT group. A requesting subscriber sends a call request message to a PTT server. The call request message is analyzed by a request processing unit and the data gathered from the analysis are correlated with profiles of subscribers of the PTT service. Based on the correlation results, the PTT server dynamically creates a PTT group comprising the requesting subscriber and one or more subscribers selected from the other subscribers of the PTT service. The PTT server sends an invitation message to the selected subscribers for establishing a PTT call and establishes a PTT communication connection among the terminal of the requesting subscriber and terminals of selected subscribers an approval message was received from.

18 Claims, 2 Drawing Sheets

METHOD OF PERFORMING A DYNAMIC PUSH-TO-TALK SERVICE

TECHNICAL FIELD

The invention relates to a method of performing a Push-to-Talk (=PTT) service as well as a server for executing this method.

The invention is based on a priority application, EP 05290535.3, which is hereby incorporated by reference.

BACKGROUND OF THE INVENTION

Today, cellular radio networks are widely used by private and business users. Such networks typically provide a full duplex point-to-point voice communication service between a calling and a called communication partner. A service becoming popular in cellular radio networks is the Push-to-Talk service. PTT calls are half duplex one-to-one or one-to-many communications: while one person speaks, the other one or more persons must listen. The right to speak is granted by pressing a push-to-talk button on a first come/first serve basis. The PTT service allows communication with a dedicated group of people. A PTT group is defined by a subscriber of the PTT service with respect to a PTT server. The group is permanently stored and exists also after the communication between the group members is finished.

US 2004/0 249 949 A1 describes a method for distributing PTT voice and multi-media messages to communities of subscribers, using a definition of PTT groups. First, a PTT group of subscribers is created in an application server (=AS), either by one of the members or by a content provider server. Then, the subscribers register their interest in receiving PTT messages related to the created group, for example by joining a Session Initiation Protocol (=SIP) related to that group. Finally, the content provider server sends a PTT message destined to the PTT group, the message comprising voice and/or multimedia information, such as, e.g., news, stock quotes, sport updates, weather or commercial information. The message is received by the AS, which distributes it to the registered subscribers of the PTT group using its definition of the PTT group.

Further communication services are known that support contacts with other people. For example, US 2004/006548 A1 describes a server of a telecommunication network, wherein the server contains a data base having information on persons looking to meet other persons. Using telephones, users can input information both with regard to a person looking to meet another person and of a desired person. The server receives such personal information, stores it in the data base and compares the person information with the data stored in the data base to find persons, the information of whom complies with the received information on the desired person. The server determines a list of such persons and transmits it to the requesting telephone. The list can be shown on the display thereof. On the telephone a selection of a person in the transmitted list can be made and information on the selected person is transmitted to the server. The server establishes a telephone connection between the telephone of the person looking to meet another person and the telephone of the selected person.

SUMMARY OF THE INVENTION

It is the object of the present invention to improve the provision of a PTT service.

The object of the present invention is achieved by a method of providing a PTT based communication service to subscribers of the PTT service, the method comprising the steps of transmitting a PTT call request message from a terminal of a requesting subscriber to a PTT server, analyzing the PTT call request message, correlating data gathered from the analysis with profiles of subscribers of the PTT service, dynamically creating a PTT group comprising the requesting subscriber and one or more subscribers selected from the other subscribers of the PTT service, based on the correlation results, sending an invitation message to the selected subscribers for establishing a PTT call, establishing a PTT communication connection among the terminal of the requesting subscriber and terminals of selected subscribers an approval message was received from. The object of the present invention is further achieved by a server for providing a PTT based communication service to subscribers of the PTT service, whereby the server comprises a communication unit for receiving a PTT call request from a terminal of a requesting subscriber, and a control unit for analyzing the PTT call request message, correlating data gathered from the analysis with profiles of subscribers of the PTT service, dynamically creating a PTT group comprising the requesting subscriber and one or more subscribers selected from the other subscribers of the PTT service, based on the correlation results, sending an invitation message to the selected subscribers for establishing a PTT call, and establishing a PTT communication connection among the terminal of the requesting subscriber and terminals of selected subscribers an approval message was received from.

The PTT server of the present invention supports PTT calls comprising media streams, i.e., audio, video, voice, text, and data streams and any mixture thereof within one PTT connection.

The present invention enables a user of a communication terminal to communicate with peers without the need to know them prior to the communication or to dial any telephone numbers. Here, peer is meant to denote a person who has the same background, interest as the user, who is able to assist the user because of his/her abilities or, more generally spoken, who develops or cultivates a short-term or a long-term social-emotional relationship with the user.

The invention provides a new communication service which does not limit the communication partners to a pre-defined, dedicated group of people like, e.g., the conventional PTT service using buddy lists, but allows to address different people with respect to every different call request that is made, dependent on the subject a requesting user wants to communicate.

As the communication group is dynamically created and set up automatically in a network server, a user is not bothered with searching for suitable communication partners by himself. Moreover, as the communication partners are dynamically selected on the basis of the subject of a certain call request, the group is disposed after the communication has finished. This maintains the privacy of the communication partners. Moreover, the dynamic grouping enhances the efficiency, as it leads to smaller data amounts to be handled and require neither space for predefined groups nor processing of group maintenance.

At the same time, the present invention enables a dynamically created communication group to change to a static communication group. Thus, a need for a possibly long-term relationship felt by the subscribers of the service is supplied. Both the communication content and information on the communication partners can be stored in the network, which is advantageous for further reference. Furthermore, users connected to different networks can participate in the service.

Further advantages are achieved by the embodiments of the invention indicated by the dependent claims.

According to a preferred embodiment of the invention, the profile of a subscriber comprises data about personal interests, knowledge, habits, preferences, qualities and other characteristic information of the subscriber. The data characterize the subscriber with respect to PTT-requested services. The profiles are correlated with data extracted from the call request message. Typical call requests concern, e.g., looking for a parking lot, selling/searching for tickets for a football match, or requesting assistance from suitable persons nearby. For the assessment of a subscriber's relevance for one of these requests, it is advantageous that the subscriber registers at the PTT server with as many relevant personal items as possible. This facilitates to find subscribers who match very closely the features defined in the call request message. Among other features, the subscriber's habitual action radius like residence location, job location, regularly driven roads, frequented localities (malls, supermarkets, pubs, . . . ), personal interests like computers, watching football in the stadium on Saturdays, and abilities like first-aid training, driving license, swimming, mechanical skills, etc. may be included into the subscriber's profile.

According to a preferred embodiment of the invention, additional data which supplements the subscriber profiles is collected. This will be advantageous in case the subscriber's profile does not provide information on an item needed to find other subscribers who match as closely as possible the features implied by the call request message. It is possible that the request analyzer uses a predefined service-specific data structure stored in a data base of the PTT server depending on the subject of the call request and fills the predefined data structure with the extracted word entities.

If the PTT server analyzes a call request message which contains a word entity denoting a specific service, the PTT server retrieves from a service-specific database a data structure which lists all the features which are important for the specific service. Some of the fields can be filled with the data extracted from the call request message, other fields have to be filled with additional information collected from other sources. Preferably, each field of the predefined service-specific data structure is assigned to a weight which defines the importance of that field for the successful provision of the PTT service. The weighted criteria of a service may be contained in a service characteristic vector.

The additional data may help to improve the correlation procedure where the data gathered from the analysis are correlated with the subscribers' profiles and the additionally collected data. The additional data may be integrated into the subscribers' profiles, or they may be kept separate. Preferably, the additional data provide the location and the presence of the subscribers. In many cases like, e.g., in an emergency event which demands immediate help, the requesting subscriber may want to address only the subscribers who are nearby and online, i.e., who will listen without delay to the PTT call. A subscriber's current location may be provided via a location service, e.g., a GSM-based location service or a satellite-based navigation system like GPS (GSM=Global System for Mobile Communication; GPS=Global Positioning System). The information on a subscriber's presence, i.e., the fact whether he is online or offline, may be available from his network provider.

Before the requesting subscriber can communicate with other PTT subscribers, the other PTT subscribers receive an invitation message which they must acknowledge if they want to participate in the PTT call. It is possible that the invitation message comprises the issue dealt with in the call request message and data about the invited group members, e.g., their names. This facilitates the other subscribers' decision to accept or to refuse the invitation.

It is further possible that the members of the dynamically created PTT group develop a long-term social-emotional relationship, e.g., find each other helpful and take to each other, so they decide they wish to meet within the group also in the future. Then they trigger the PTT server, e.g., by pressing a button on the terminal, to convert the dynamically created group into a static group and store the static group in the PTT server. From then on, each member of the group is able to set up a call to the other members of the static group in the way known from a conventional PTT call service, e.g., by choosing the static group in a menu provided by the PTT server.

According to a preferred embodiment of the invention, the PTT service provides the possibility to select a PTT subgroup of subscribers from the dynamically created PTT group. The subgroup may be chosen as a function of a specific property characterizing the members of the subgroup. It is also possible that the procedure of dynamically creating a PTT group takes only into account subscribers who belong to a specific user group, particularly a specific PTT group. The data specifying the restriction of the selection process to a limited group of subscribers may be sent to the PTT server by an action of the requesting subscriber or may be automatically comprised within the call request message, e.g., by a static and permanent setting of communication terminal or the used communication network.

The call request message can be written or spoken using natural language or it can be entered with help of a predefined input form. The request processing unit analyzes the call request message received from the requesting subscriber's terminal by means of a lexical, syntactic and semantic analyzer. Preferably, the request processing unit comprises a request analyzer arranged to deconstruct a natural language sentence of the call request message in word entities, analyze the natural language sentence semantically, transform it into a data structure adapted for correlating with profiles of subscribers of the PTT service, if the sentence is valid. Thus, the request analyzer extracts information from the received call request message that is necessary for selecting a group of matching subscribers from that of all possible subscribers.

According to a preferred embodiment of the invention, the dynamic selection of subscribers performed by the request processing unit uses special service criteria, where weighed coefficients are assigned to items of a subscriber's profile regarding their importance for the service. Preferably, the request processing unit supports subscriber selection by neural networks. A neural network supports subscriber selection in a stochastic environment. It attempts to learn which subscribers are better predestinated to form a group and to better perform in the execution process of the service. Thanks to learning potential of a neural network the system will be capable to produce high-quality results in situations where static selection algorithms fail.

According to a preferred embodiment of the invention, the PTT server comprises in addition a service quality measurement module. The service quality measurement module rates the quality of subscribers that took part in a service and hands over a service quality characteristic vector containing rated subscribers to the request processing unit.

According to another preferred embodiment of the invention, the request processing unit correlates subscriber profiles with data gathered from the call request message and excludes subscribers who do not comply, matches the remaining subscribers based on a service characteristic vector, a service quality characteristic vector and information gathered from the call request message and determines a subscriber list of best suited subscribers based on the matching. Further, the control unit starts and controls the execution of a service, stores subscriber data that is necessary for analysis of the quality of the subscriber service contribution and hands over these data after termination of the service to the service quality measurement module.

BRIEF DESCRIPTION OF THE DRAWINGS

These as well as further features and advantages of the invention will be better appreciated by reading the following detailed description of presently preferred exemplary embodiments taken in conjunction with the accompanying drawings of which.

DETAILED DESCRIPTION OF THE INVENTION

Figure 1:
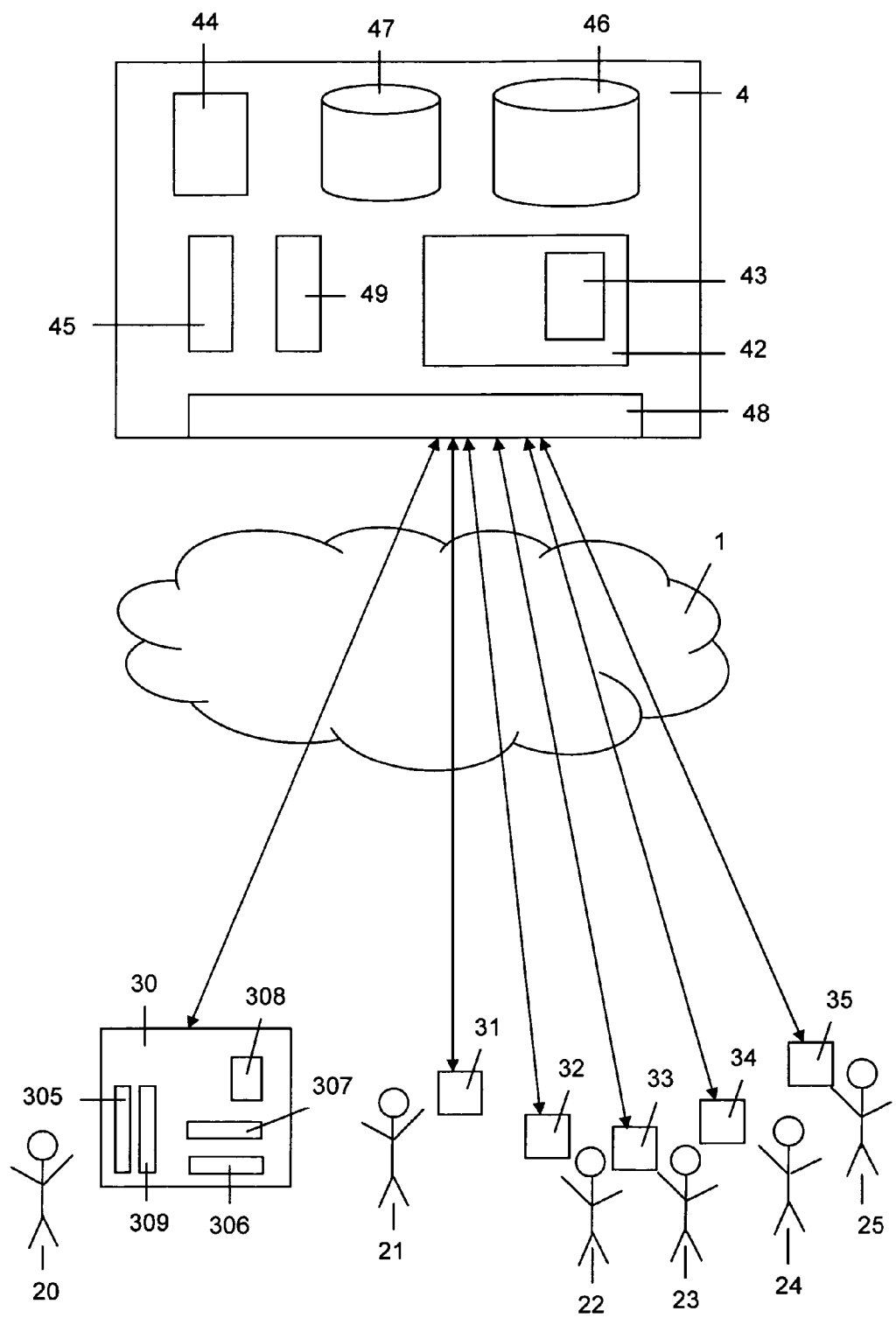
FIG. 1 is a block diagram showing a communication system with a PTT server according to a first embodiment of the invention.

FIG. 1 shows a communication network 1, a PTT server 4, and a plurality of wireless communication terminals 30 to 35 assigned to subscribers 20 to 25.

The communication network 1 is a communication network capable to enable a synchronous or asynchronous communication between the communication terminals 30 to 35 and the network server 4. Preferably, the communication network 1 is a mobile communication or cellular phone network, for example according to the GSM or UMTS standard (UMTS=Universal Mobile Telecommunications System). According to a further embodiment the communication network 1 is a data network, preferably an IP-network (IP=Internet Protocol). Such network may be composed of various physical sub-networks, for example ATM-networks and wireless access networks interlinked via a common level 3 IP communication layer (ATM=Asynchronous Transfer Mode). Preferably, the communication network 1 provides a wireless, IP based communication server. It comprises one or more cellular radio networks which support the transfer of packetized information via "always on" connections. For example, such wireless communication network is a GSM network supporting a GPRS service which makes it possible for the subscribers 20 to 25 to exchange in addition to "normal voice traffic" packet switched data traffic via the radio interface (GPRS=General Packet Radio Service). Further, UMTS, EDGE, or 4G networks may support IP based packet switching service (EDGE=Enhanced Data Rates for GSM Evolution).

The wireless terminals 30 to 35 are PTT enabled devices which are equipped with the functionalities to support a push-to-talk service. Each of the wireless terminals 30 to 35 are composed of an electronic circuit having a radio part and at least one microprocessor, as well as application programs executed by the at least one microprocessor, and input and output means, for example a microphone, a loudspeaker, a keypad and a display. The functionalities of the wireless terminals 30 to 35 are performed by the interaction of these hardware and software components. From a functional point of view, the mobile terminals 30 to 35 comprise an input unit 305, an output unit 309, a radio communication unit 306, a packet radio service unit 307 and a push-to-talk client 308.

The units 305 to 309 comprised within each of the mobile terminals 30 to 35 are drawn in FIG. 1 with respect to only the exemplary mobile terminal 30. The remaining mobile terminals 31 to 35 are also meant to comprise this set of units although it is not explicitly drawn in FIG. 1 for reasons of convenience.

The radio communication unit 306 represents the "normal" radio communication capabilities of a cellular phone and comprises, for example, the part of the wireless terminal 30 that handles the radio interface and the associated GSM protocol stack. The radio communication unit 306 provides the "normal" telephone service of a GSM or UMTS handset.

The packet radio service unit 307 represents the functionalities of the wireless terminal which supports exchange of packet-switched data through the wireless communication network 1. For example, the packet service unit comprises functionalities for handling the GPRS protocol stack. Accordingly the packet service unit 307 provides corresponding packet transfer services to the push-to-talk client 308.

The push-to-talk client 308 handles the client's part of the push-to-talk service. If the user initiates a push-to-talk communication, e.g. by activating a push-to-talk button, it sends a corresponding push-to-talk call request to the push-to-talk server 4. Further, the push-to-talk client 308 comprises functionalities to transfer an audio stream via an IP based communication network, for example, functionalities to handle the RTP and the SIP protocol stacks (RTP=Real Time Protocol). Further, it comprises a corresponding media player to input/output an audio stream.

For example, the wireless terminals 30 to 35 are assigned to the subscribers 20 to 25. The subscribers 20 to 25 are registered as subscribers of the push-to-talk service provided by the push-to-talk server 4 at the subscriber data base 46. The terminals 30 to 35 are, e.g., mobile phones, PDAs (=Personal Digital Assistant) or computers having communication capabilities to communicate with the PTT server 4 via the communication network 1. Various communication services might be used by the subscriber 20 to send a PTT call request message to the PTT server 4. For example, the service request message is a spoken natural language message sent from the terminal 30, e.g., a mobile phone to the PTT server 4. Or the terminal 30 is a computer executing an e-mail-application and the PTT call request message is an e-mail containing written natural language. It is also possible that the terminal 30 is a PDA and the PTT call request message sent from the subscriber 20 to the PTT server 4 is an SMS or MMS message that contains written or spoken natural language. Further, it is possible that the terminal 30 executes a browser application interacting with a corresponding server application of the PTT server 4 and the PTT call request message is an XHTML, HTML or WAP message containing the content of an input mask filled by the user 20 of the terminal 30 (HTML=Hyper Text Markup Language; XHTML=Extended Hyper Text Markup Language, WAP=Wireless Application Protocol).

According to a preferred embodiment of the invention, the PTT server 4 provides an IP-based push-to-talk service. For example, the subscriber 20 uses a mobile phone 30 having access to a packet switched radio communication service (e.g. GPRS). The terminal 30 executes a push-to-talk client that handles the client part of the push-to-talk service. The PTT call request message sent from the subscriber 20 to the PTT server 4 contains data of an input mask or a written or spoken natural language text inputted by the subscriber 30. The push-to-talk client comprises functionalities to transfer media streams via an IP based communication network, e.g. functionalities to handle the RTP and the SIP protocol stacks.

The PTT server 4 is constituted of one or several interlinked computers, a software platform and various application programs executed on the system platform provided by the aforementioned hardware and software platform. The functionalities of the PTT server 4 are performed by the execution of these software components by the hardware components of the PTT server 4. From a functional point of view, the PTT server 4 comprises a request processing unit 42 comprising a request analyzer 43, a service quality measurement module 44, a control unit 45, a subscriber data base 46, a service characteristic data base 47, a communication unit 48, and an administration unit 49.

The communication unit 48 represents hardware and software components of the PTT server 4 that support the communication service with the terminals 30 to 35 of the subscribers 20 to 25. For example, the communication unit 48 contains components to execute the TCP/IP, HTTP or RTP/SIP protocol stacks (TCP=Transmission Control Protocol; HTTP=Hypertext Transfer Protocol).

Further, the communication unit 48 optionally contains functionalities for modality conversion, for example speech recognition module or a text to speech conversion module.

The subscriber data base 46 stores subscriber profiles of subscribers registered for the PTT service at the PTT server 4. The subscriber profiles contain characteristic information of the corresponding subscriber, for example name, gender, age, personal situation, occupational activities, personal interests, attitudes (for example that the subscriber regularly drives a specific route), knowledge, skills and competences as well as preferences of the respective subscriber.

The administration unit 41 provides an access interface to register and enroll users of the push-to-talk service which enables these users to change and administrate their subscriber data stored in the subscriber data base 46.

The service characteristic data base 47 stores profiles of different services that might be provided within a group of subscribers. The service characteristic data base 47 contains the different services with their particular criteria. Typical services which are often demanded from the PTT service are, e.g., searching a place, selling or buying tickets, calling for assistance, etc. In the case of calling for assistance, suitable criteria will be: location, kind of emergency (traffic accident, physical collapse, mechanical problem, crime, etc.), type of assistance (professional/volunteer), etc. Each criterion of a service is assigned to a special weight regarding its importance on the service. The service characteristic data base 47 sends on demand a service characteristic vector containing the weighted criteria of a service to the request processing unit 42.

The control unit 45 performs typical control and call control functions of a PTT server and general functions like, e.g., establishing the PTT call and setting up invitation messages to group members of the requesting subscriber for establishing the PTT call.

Input of the request processing unit 42 is a call request message received from the terminal 30 of the subscriber 20 provided by the communication unit 48. The message can be in the form of natural language input or it can be data of an input mask. The input is converted by the request analyzer 43 to a data structure. The request analyzer 43 deconstructs an incoming natural language sentence into word entities and analyzes the entirety of word entities. If the sentence is valid, the request analyzer 43 transforms it into a data structure useful for the correlation procedure. In case of an input mask, the request analyzer 43 transforms the data structure into a standard data structure, removes blanks and other redundant space and creates a valid data structure.

The service quality measurement module 44 rates the quality of contributions from subscribers that took part in previous PTT calls. The contributions are rated in consideration of their usefulness for the PTT call. The service quality measurement module 44 hands a service quality characteristic vector over to the control unit 45. The service quality characteristic vector contains the quality rated subscribers.

The request processing unit 42 recognizes the service contained in the data structure, collects additional data and completes the data structure with said additional data. Preferably, it recognizes the service request contained in the data structure and gets additional information that is necessary for the realization of the service. Information on what additional information may be useful for the realization of the PTT service can be retrieved from the service characteristic data base 47. Further, the request processing unit 42 correlates profiles of registered subscribers and service specific criteria received from the subscriber data base 46 and the service characteristic data base 47 with the data of the data structure. Optionally, the correlation process uses the service quality characteristic vector received from the service quality measurement module as an additional input parameter. Then, the request processing unit 42 dynamically selects a group of subscribers based on the matching of subscribers by the correlation process. Then, the request processing unit 42 subsequently sends information containing the resulting subscriber list of a service and additional information to the service quality measurement module 44.

Figure 2:
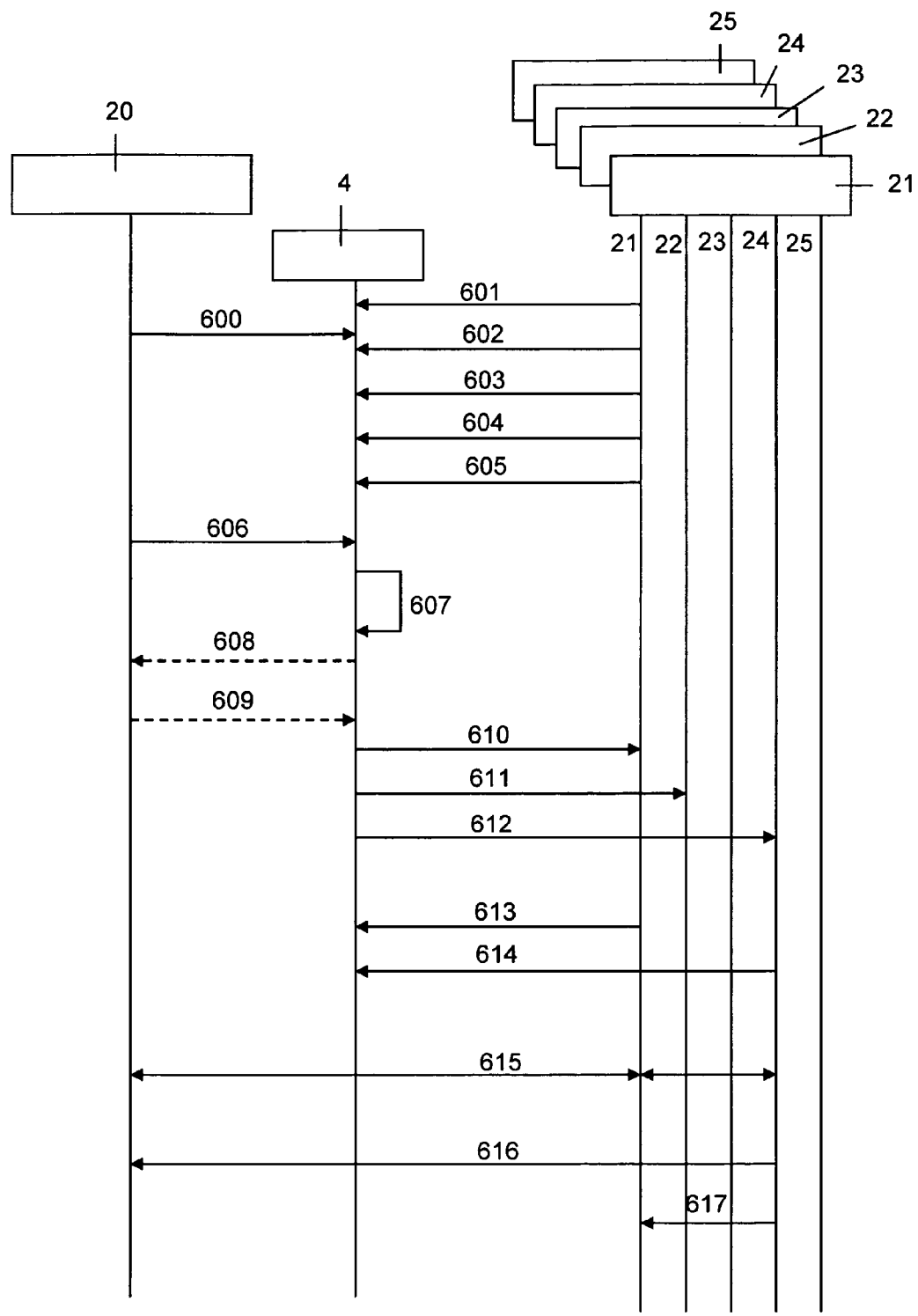
FIG. 2 is a nodal operation and signal flow diagram illustrative of a first embodiment of the invention.

FIG. 2 shows a nodal operation and signal flow diagram illustrative of the embodiment of the invention according to FIG. 1.

FIG. 2 schematically shows subscribers 20 to 25 who register for a dynamic PTT service by sending registering messages 600 to 605 to the PTT server 4 providing a dynamic push-to-talk (=PTT) based communication service. The registering messages 600 to 605 comprise an affirmative element which indicates that the respective subscriber wishes to participate at the dynamic PTT service. Preferably, the registering messages 600 to 605 also comprise profiles of the registering subscribers 20 to 25, i.e., characteristic information of the corresponding subscribers 20 to 25.

One of the subscribers 20 to 25 registered for the DPTT service at the PTT server 4 wishes to communicate via the PTT call service with other subscribers having the same or a similar experience background, or are suitable to assist him with an issue.

For example, a PTT call request message 606 containing a natural language sentence is sent from the communication terminal 30 assigned to the requesting subscriber 20 through the communication network 1 to the PTT server 4. For example the sentence is formed by the question "Is there free parking space for my truck at a rest area for lunch time?" Apart from the exemplary issue of parking lots, the PTT server 4 may also support a variety of other services concerning, e.g., emergency calls, travel and traffic requests, sales of tickets, etc.

The communication unit 48 receives the call request message and forwards it to the control unit 45. From there the call request message is routed to the request processing unit 42. The request analyzer 43 of the request processing unit 42 lexically, syntactically and semantically analyzes this sentence, deconstructs it into entities and transforms the entities into a data structure, e.g. containing the word entities "parking space", "truck", "rest area", "lunch time". The request processing unit 42 recognizes from the data of this data structure that the request addresses a service "search for parking spaces", e.g. through correlation with a keyword list retrieved from the service characteristic data base 47, the keyword list proposing to link the phrase "parking space" to the service "search for parking spaces".

Then, the request processing unit 42 of the PTT server 4 determines by means of service characteristic data of this service the missing data which has to be gathered for the realization of the service. For example, it fills the data structure with additional information from the subscriber profile of the subscriber 20 requesting the service. For example, it adds the length of the subscriber's truck to the data structure. Further, it gathers additional information as time or position of the subscriber 20 from external sources, e.g. a GPS system or another localization service.

In a next step, it correlates the extended data structure with service characteristic data of the service retrieved from the service characteristic data base 47, subscriber profiles of the subscribers 21 to 25 retrieved from the subscriber profile data base 46 and the service quality vector retrieved from the service quality measurement module 44. It dynamically selects a group of subscribers, e.g., close to a rest area in the neighborhood of the subscriber 20 or indicated in the user profile as having knowledge about the issue and indicated by the service quality characteristic vector as subscribers showing good support for such kind of service query. Finally, the request processing unit 42 builds up a push-to-talk communication group comprising the requesting subscriber 20 and the selected subscribers resulting from the correlation procedure, i.e., the subscribers 21, 22 and 24. This internal steps are indicated in FIG. 2 as operational flow 607.

It is possible that the requesting subscriber 20 receives an information message 608 from the PTT server 4 from which he learns the characteristics of the created PTT group members, namely that the PTT group comprises all subscribers who are near potential parking lots down the road. Then the requesting subscriber 20 may decide that he first wants to talk to truckers. The additional feature "trucker" is transmitted, e.g., as a voice message 609, from the subscriber's terminal to the PTT server which creates a subgroup out of the dynamically created group, the subgroup only comprising subscribers who are also truckers. If the requesting subscriber 20 is not satisfied with the communication results of the PTT subgroup "truckers", he may switch back to the originally created bigger PTT group, e.g., by sending another message to the PTT server 4.

Then, the control unit 45 of the PTT server 4 creates invitation messages 610 to 612 for inviting the selected subscribers 21, 22, 24 to actively participate in the PTT call. The invitation messages 610 to 612 may simply consist of an SMS indicating that a PTT call is to be established. Preferably, the invitation messages 610 to 612 contain all information necessary to understand the request of the requesting subscriber 20, here, that the requesting subscriber 20 searches a parking space for a truck with a length of 12 meters between 12:30 pm and 01:00 pm at one of the following rest areas x,y,z. It is also possible that the invitation message comprises at least partly the PTT call request message received from the requesting subscriber 20. It may be advantageous that also data about the dynamically created PTT group are contained in the invitation message, preferably the names of the group members 20, 21, 22, 24.

The invitation messages 610 to 612 are sent to the dynamically created PTT communication group except the requesting subscriber 20, i.e., to the subscribers 21, 22, 24. If one of the subscribers 21, 22 and 24 intends to support the requesting subscriber 20 in his search, he acknowledges the invitation by an approval message 613, 614, for example by pressing a push-to-talk button. Let us assume in this example that two selected subscribers 21, 24 want to assist the requesting subscriber 20 while the third selected subscriber 22 does not wish to join the PTT call group. Then the PTT server 4 automatically establishes an IP based half-duplex communication channel 615 between the members of the PTT call group, i.e., the requesting subscriber 20 and the selected subscribers 21, 24 who have acknowledged the invitation.

Now the prerequisites for a conventional PTT call among the subscribers 20, 21, 24 are fulfilled. The right to speak is granted among the subscribers 20, 21, 24 by pressing a push-to-talk button on a first come/first serve basis. When detecting the actuation of a push-to-talk key of a terminal 30, 31, 34, the respective terminal 30, 31, 34 transmits a push-to-talk call to the terminals of the other subscribers of the group. For example the subscriber 24 presses his PTT button and the PTT server 4 establishes a VoIP based push-to-talk communication connection 616, 617 between the subscriber 24 as sending party and the subscribers 20 and 21 as receiving parties.

It is also possible that after approving the invitation by the subscribers 21, 24, 20 the PTT call request message originally sent by the requesting subscriber 20 is transmitted to the accepting subscribers 21, 24 from a memory unit of the PTT server 4, e.g., the subscriber data base 46. Then the subscribers 21, 24 can listen to the original call request message and afterwards immediately press their PTT button to contact the requesting subscriber 20.

When the PTT conversation finishes, the dynamically created PTT group is disposed. Alternatively, in case the subscribers 20, 21, 24 feel a need to stay in contact on a long-term basis, the PTT server 4 is adapted to convert the PTT group in a static group permanently stored, e.g., in the subscriber data base 46, and to be re-activated by any of the group members.

The procedures of correlating, selecting and creating which are performed by the server 4 may not comprise all subscribers of the PTT service but may be restricted to a limited group of subscribers. The data which specify the limited group may be put into the requesting subscriber's terminal by the requesting subscriber and be transmitted together with the call request message to the server 4. It is also possible that the data are pre-stored in the server 4 and are activated by a message received from a certain subscriber.

For example, a security officer may carry a mobile phone which stores an indicator specific of the security officer's organization in a memory of the mobile phone. This may be the case when the security officer uses a mobile phone provided by his organization. When the security officer sends a call request message to the server 4, the indicator is automatically appended to the call request message signaling to the server 4 that only those subscribers of the PTT service have to be considered for the procedures of correlating, selecting and creating who belong to the security officer's organization, i.e., who are also security officers. This makes sure that confidential data is not distributed to unwanted persons.

It is also possible that the security officer deliberately has to press a specific button to add the indicator to the call request message, e.g., when he uses a mobile phone during both off and on duty hours. Alternatively, the server 4 is adapted to recognize the sender of the call request message as a member of a specific organization and restricts the selection of subscribers for the PTT group to a pre-defined subgroup of PTT subscribers.

The positional information of a subscriber, i.e., data concerning his location can be of eminent significance for the provision of a dynamic PTT service according to the present invention. In a preferred embodiment, a subscriber's positional information is a part of the subscriber's profile which must be updated when the subscriber changes his position.

It is advantageous that the positional information of the profile is updated on a regular basis by the server 4. The subscriber's terminal may contain a navigational unit co-operating with a navigation system like, e.g., GPS. Alternatively, the position of the subscriber's terminal may be determined by means of a location service provided by a wireless communication network operator, e.g., of a GSM network. Then the server 4 may send a position data request to the subscriber's terminal or a location server of a position determining system co-operating with the subscriber's terminal and receive in return the current positional information of the subscriber which is used by the server 4 to update the subscriber's profile. It is also possible that the server 4 automatically receives the updated positional information from the corresponding terminal or location server without the need for a position data request.

It is also possible that the subscriber manually indicates to the server 4 that he has changed his position. This may be achieved by pressing a specific button on the subscriber's terminal which in turn triggers the determination of his position by means of a position determining system as described above. As a simple embodiment, it is also possible that the subscriber has registered a set of regularly attended places to the server 4. Whenever the subscriber changes from a specific place to another, he sends, for example by pressing a button on his terminal, a message comprising an indicator to the server 4, the indicator indicating the currently attended place of the set of regularly attended places. This may be particularly practical if the subscriber attends a limited set of places in a recurrent, circular sequence like, e.g., a night watchman on a pre-defined tour on a company's premises.

The invention claimed is:

1. A method of providing a push-to-talk (PTT) based communication service to subscribers of the PTT service, the method comprising the steps of:
    transmitting a PTT call request message from a terminal of a requesting subscriber to a PTT server;
    analyzing the PTT call request message by deconstructing a natural language sentence of the PTT call request message into word entities, analyzing the word entities, and transforming the word entities into a data structure for correlating with profiles of subscribers of the PTT service, if the sentence is valid;
    correlating data gathered from the analysis with profiles of subscribers of the PTT service;
    dynamically creating a PTT group comprising the requesting subscriber and one or more subscribers selected from the other subscribers of the PTT service, based on the correlation results;
    sending an invitation message to the selected subscribers for establishing a PTT call;
    establishing a PTT communication connection among the terminal of the requesting subscriber and terminals of selected subscribers an approval message was received from;
    converting the dynamically created group into a static group; and
    storing the static group in the PTT server.

2. The method of claim 1, wherein the profiles of the subscribers comprise data about personal interests and/or knowledge and/or habits of the subscribers.

3. The method of claim 1, wherein the method comprises the steps of:
    collecting additional data supplementing the profiles of the subscribers;
    correlating data gathered from the analysis with the additional data and/or with the profiles of the subscribers supplemented with the additional data.

4. The method of claim 3, wherein the additional data comprise data concerning the location and/or the presence of the subscribers.

5. The method of claim 1, wherein the invitation message comprises the subject of the call request message and/or information about the group members.

6. The method of claim 1, wherein the method comprises the further step of:
    selecting a subgroup of subscribers from the dynamically created PTT group or selecting the one or more subscribers from the other subscribers belonging to a same user group.

7. A server for providing a push-to-talk (PTT) based communication service to subscribers of the PTT service, the server comprising:
    a communication unit for receiving a PTT call request from a terminal of a requesting subscriber, and
    a control unit for analyzing the PTT call request message by deconstructing, by means of a request analyzer, a natural language sentence of the PTT call request message into word entities, analyzing the word entities, and transforming the word entities into a data structure for correlating with profiles of subscribers of the PTT service, if the natural language sentence is valid, correlating data gathered from the analysis with profiles of subscribers of the PTT service, dynamically creating a PTT group comprising the requesting subscriber and one or more subscribers selected from the other subscribers of the PTT service, based on the correlation results, sending an invitation message to the selected subscribers for establishing a PTT call, establishing a PTT communication connection among the terminal of the requesting subscriber and terminals of selected subscribers an approval message was received from, converting the dynamically created group into a static group, and storing the static group in the PTT server.

8. The server of claim 7, wherein the server comprises a service quality measurement module for assessing the commitment of a subscriber with regard to the PTT service.

9. A method of providing a push-to-talk (PTT) communication service to subscribers, comprising:
    a) receiving a call request message from a terminal of a requesting subscriber at a network server;
    b) converting the call request message to standard data by deconstructing a natural language sentence of the call request message into word entities, analyzing the word entities, and transforming the word entities into an initial data structure for correlating with subscriber data stored in subscriber profiles;
    c) collecting additional data associated with the call request message from subscriber data stored in a subscriber profile for the requesting subscriber;
    d) adding the additional data to the data structure to form an extended data structure;
    e) correlating the extended data structure with subscriber data stored in subscriber profiles for other subscribers to dynamically select one or more other subscribers showing support for the call request message; and
    f) dynamically building a communication group comprising the requesting subscriber and the one or more selected subscribers for use in conjunction with a PTT call associated with the call request message.

10. The method of claim 9, further comprising:

g) sending an invitation message to the corresponding terminals of the one or more selected subscribers of the communication group for participation in the PTT call with the requesting subscriber;
h) receiving an approval message from the corresponding terminals of one or more invited subscribers acknowledging support for the PTT call; and
i) establishing the PTT call among the corresponding terminals of the requesting subscriber and one or more acknowledging subscribers.

11. The method of claim 9, further comprising:
g) converting the dynamic communication group built in f) into a static communication group; and
h) storing the static communication group in the network server.

12. The method of claim 9, the subscriber data stored in the subscriber profiles including at least one of presence, position, and time in relation to the corresponding subscriber and the call request message.

13. The method of claim 9, further comprising:
g) retrieving a keyword list associated with specific services provided by the network server from a service characteristic database; and
h) correlating the initial data structure with the keyword list to select specific services related to the call request message; and
i) determining which types of additional data to collect in c) based at least in part on the selected services.

14. The method of claim 13, further comprising:
j) correlating the extended data structure with service characteristic data stored in the service characteristic database for the selected service to dynamically select the one or more other subscribers in e).

15. The method of claim 9, further comprising:
g) correlating the extended data structure with service quality vectors retrieved from a service quality measurement module for the other subscribers to dynamically select the one or more other subscribers in e).

16. The method of claim 9, further comprising:
g) sending an information message to the terminal of the requesting subscriber with characteristics of the one or more selected subscribers of the communication group built in f);
h) receiving an additional message from the terminal of the requesting subscriber with an additional feature for the communication group; and
i) selecting a communication subgroup of the communication group built in f) comprising the requesting subscriber and at least a portion of the one or more other subscribers selected in e) based at least in part on the additional message.

17. The method of claim 16, further comprising:
j) sending an invitation message to the corresponding terminals of the one or more selected subscribers of the communication subgroup for participation in the PTT call with the requesting subscriber;
k) receiving an approval message from the corresponding terminals of one or more invited subscribers acknowledging support for the PTT call; and
l) establishing the PTT call among the corresponding terminals of the requesting subscriber and one or more acknowledging subscribers.

18. The method of claim 9 wherein the dynamic communication group built in f) is disposed when the PTT call is finished.

* * * * *